Patented Oct. 10, 1939

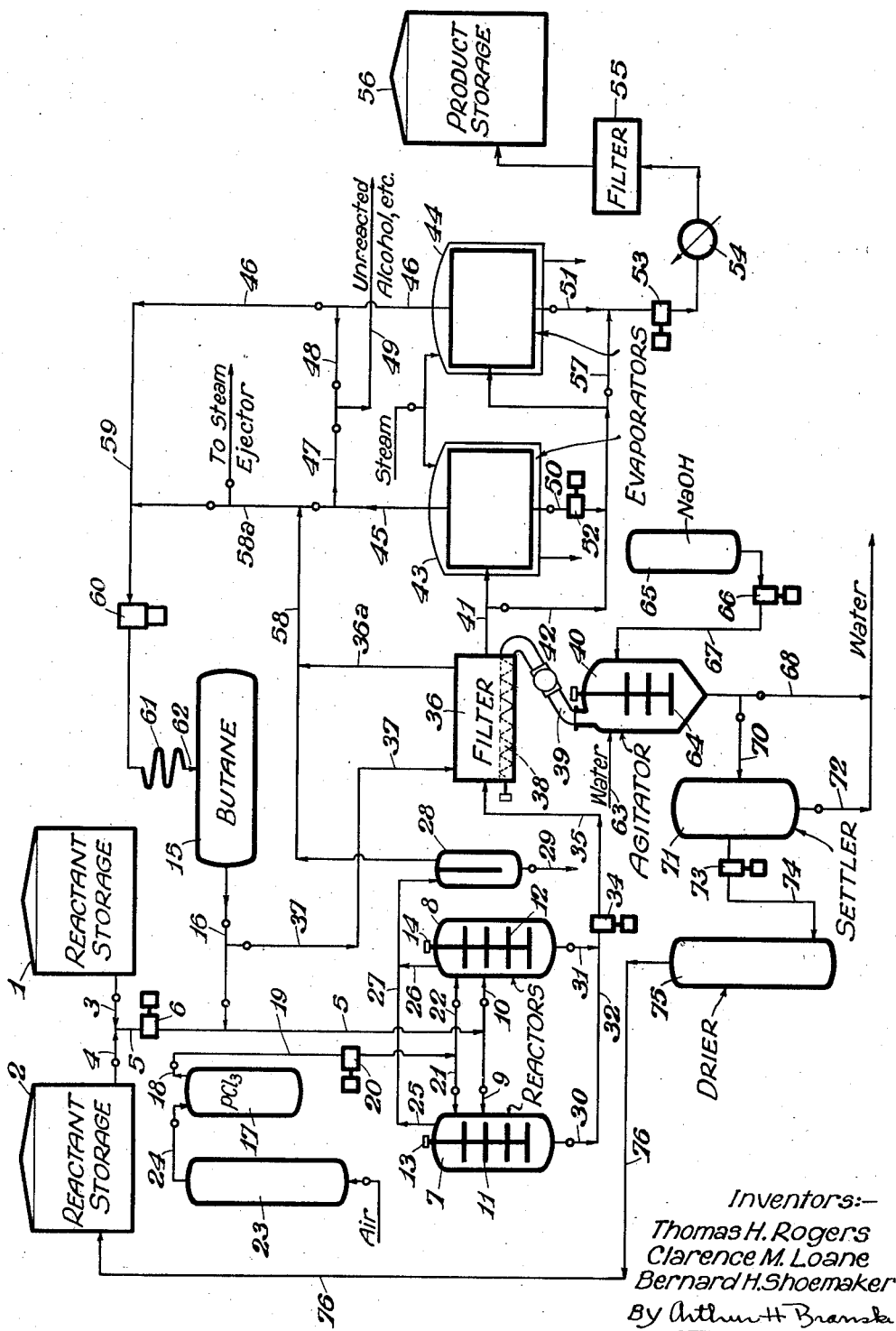

2,175,509

UNITED STATES PATENT OFFICE 2,175,509

PREPARATION OF PHOSPHOROUS ACID ESTERS

Thomas H. Rogers, Clarence M. Loane and Bernard H. Shoemaker, Hammond, Ind., assignors to Standard Oil Company, Chicago, Ill., a corporation of Indiana Application December 21, 1936, Serial No. 117,102

18 Claims. (Cl. 260—461)

This invention relates to improvements in the method of preparing esters of phosphorous acid and, in particular, the alkyl phosphites.

It is known that alkyl phosphites can be prepared by reacting an alcohol or alcoholate with phosphorous trichloride with or without the addition of an organic base such as pyridine. Alkyl phosphites prepared by simply treating alcohols with $PCl_3$ are mixtures of mono, di and/or tri alkyl phosphites; and to obtain substantially pure tri alkyl phosphites or mixtures of di and tri alkyl phosphites requires careful fractionation and purification of the mixture of alkyl phosphites.

It is an object of the present invention to provide an expedient method of preparing substantially pure tri alkyl phosphite or substantially pure tri alkyl phosphite containing desired amounts of the di-alkyl phosphite.

It is another object of this invention to provide a method of preparing alkyl phosphites in which the formation of mono and di alkyl phosphite is avoided.

It is a further object of this invention to provide a method of obtaining substantially pure tri alkyl phosphite without the necessity of careful fractionation.

Other objects and advantages of this invention will become apparent from the following description thereof, read in conjunction with the accompanying drawing which is a schematic flow diagram of a preferred embodiment of this invention and which forms a part of this specification.

Referring to the drawing, alcohol from a storage tank 1 and dimethyl aniline, from a storage tank 2 are introduced through lines 3, 4 and 5 by means of a pump 6 into one or more glass-lined reactors 7 and 8 by means of branched valved lines 9 and 10. The glass-lined reactors 7 and 8 are equipped with suitable agitating means such as paddle stirrers 11 and 12 operated by suitable means such as motors 13 and 14.

The mixture of alcohol and dimethyl aniline is diluted with a suitable solvent, preferably a solvent which may be used both as a diluent and as a refrigerant such as methyl chloride, methyl ether, or liquefied normally gaseous hydrocarbons, such as propane, butane, pentane, and/or mixtures thereof from a storage tank 15 and introduced into the alcohol and dimethyl aniline mixture through a valved line 16. Phosphorous trichloride from a storage tank 17 is introduced through valved lines 18 and 19 and pump 20 into the reactors 7 and 8 through the branched valved lines 21 and 22. The phosphorous trichloride may be removed from the storage tank 17 by suitable means such as compressed air introduced into the storage tank 17 through a drying tower 23 and a valved line 24.

During the reaction period the temperature in the reactors 7 and 8 is controlled and maintained by controlling the pressure therein. To lower the temperature the liquefied normally gaseous hydrocarbon is vaporized and the temperature reduced to the desired degree. The vaporized hydrocarbons are removed through lines 25, 26 and 27 into a trap 28 wherein entrained products from the reactors are separated from the gaseous hydrocarbons and removed through a valved line 29. Lines 25, 26 and 27 and trap 28 should be of acid resistant material. During the course of the reaction additional butane is added to replace that which has evaporated. The reaction mixture is allowed to stand several hours after all the $PCl_3$ has been added.

The reaction products are removed from reactors 7 and 8 through valved lines 30, 31, 32, a pump 34 and a line 35 and introduced into a separating device, such as a rotary filter, a centrifuge or filter press 36 wherein the desired alkyl phosphite is separated as filtrate from the dimethyl aniline hydrochloride formed in the reaction. The filter cake may be washed with a suitable solvent, preferably a liquefied normally gaseous hydrocarbon, which is introduced into the filter from the hydrocarbon storage tank 15 through a line 37. The dimethyl aniline hydrochloride after being freed of the solvent by suitable means, is removed from the filter press 36 by suitable means such as a screw conveyor 38 and introduced through a suitable transfer means 39 into an agitator 40 wherein the dimethyl aniline is recovered as hereinafter described.

The filtrate from the filter press 36 is introduced through a line 41 and a valved line 42 into one or more glass-lined, steam jacketed evaporators 43 and 44 wherein the solvent, such as the liquefied normally gaseous hydrocarbons, is removed from the alkyl phosphite by heating in the evaporators 43 and 44 and removing the vaporized hydrocarbon through lines 45 and 46. After the solvent has been removed, the pressure within evaporators 43 and 44 is reduced and any unreacted alcohol and/or unreacted dimethyl aniline are removed from the evaporators 43 and 44 through valved lines 47, 48 and 49 by raising the temperature within the evaporators 43 and 44 to about 210°–250° F. by suitable means, such as indirect steam heating.

The substantially pure alkyl phosphite is removed from the evaporators 43 and 44 through valved lines 50 and 51 by means of pumps 52 and 53, cooled in a cooler 54 and passed through a suitable filtering medium such as a canvas filter 55 and introduced into a storage tank 56. If desired, the evaporator 44 may be bypassed through a valved line 57 directly to the line 51 and thence to the storage tank 56.

The pressure on the system is preferably reduced by means of a steam ejector system (not shown) on the gaseous hydrocarbon exhaust lines 58 and 58a. In order to obtain the necessary reduction in pressure, particularly the necessary distillation pressure which should be about 30–50 mm. of Hg., it is advantageous to use three or more steam ejectors in series.

The gaseous hydrocarbon removed from the trap 28, the filter press 36 and the evaporators 43 and 44 through lines 36a, 45 and 46 respectively, is combined through the valved lines 58, 58a and 59 and introduced into compressor 60 wherein the gaseous hydrocarbon is liquefied and passed through a condenser 61 and a valved line 62 to storage tank 15.

The dimethyl aniline hydrochloride introduced into the agitator 40, as hereinbefore described, is mixed with a small amount of water, introduced through a line 63, by means of stirrer 64. The mixture of dimethyl aniline hydrochloride and water is then treated with caustic introduced into the agitator 40 from a tank 65 through a pump 66 and a line 67. The addition of caustic soda to the mixture of dimethyl aniline hydrochloride and water results in the formation of dimethyl aniline base and sodium chloride. After settling, a greater portion of the water is removed from agitator 40 through a valved line 68 and the dimethyl aniline base then introduced through a valved line 70 into a settler 71 wherein the remaining aqueous solution is separated from the dimethyl aniline base, and the former withdrawn from the settler 71 through a valved line 72. The substantially pure dimethyl aniline is removed from the settler 71 by means of a pump 73, introduced through a line 74 into a drying tower 75 from whence it passes through a line 76 to the dimethyl aniline storage tank 2. The recovered dimethyl aniline may be distilled if desired.

The method of practicing this invention will be illustrated by describing the method of preparing tri normal butyl phosphite, it being understood that the same is not a limitation of the invention but merely illustrative of a preferred embodiment thereof.

Equal molecular volumes of normal butyl alcohol and dimethyl aniline from their respective storage tanks 1 and 2 are mixed with several volumes of liquefied butane from the butane storage tank 15, and introduced into either or both of the glass-lined reactors 7 and 8. When the mixture of normal butyl alcohol and dimethyl aniline in butane solution reaches a temperature of about 25°, phosphorous trichloride from the PCl₃ storage tank 17 in the ratio of 1 mol of phosphorous trichloride to 3 mols of normal butyl alcohol is introduced into the reactors 7 and 8.

The term butane as used herein includes the normally gaseous hydrocarbon fraction obtained from normally gaseous hydrocarbons resulting from the cracking of mineral oil, which fraction is composed of about 19% isobutane (of which about 45% is unsaturates), about 78% n-butane (of which about 32% is unsaturates) and about 3% pentanes.

In the reaction between the PCl₃, n-butyl alcohol and dimethyl aniline, the dimethyl aniline hydrochloride, which is formed, separates on the sides of the reactors thereby preventing efficient and effective cooling by indirect means such as brine cooling. We obtain effective and efficient cooling and temperature control by direct cooling of the reaction mass by reducing the pressure within the reactors 7 and 8 whereby a portion of the butane is vaporized and the desired refrigeration thereby obtained and thereafter maintaining said pressure constant throughout the reaction period. The vaporized butane is removed from the reactors through the lines 25 and 26 and passed into the trap 28 wherein entrained material is separated out. During the course of the reaction additional butane is added to replace that which has been evaporated. By this procedure a temperature of about 25° F. is maintained in the reactors 7 and 8 during the reaction period.

The pressure within the reactors 7 and 8 may be regulated by means of compressors or other suitable means such as by means of a steam ejector (as hereinbefore described). During the period in which the phosphorous trichloride is added the contents of the reactors 7 and 8 are vigorously agitated by means of the stirrers 11 and 12.

After the required amount of phosphorous trichloride has been added the reaction mixture is allowed to stand for a period of about 8 hours or longer during which time the temperature is maintained at about 25° F. At the end of this period the reaction mixture is introduced into the filter press 36. The reaction mixture from the reactors 7 and 8 comprises substantially pure tri normal butyl phosphite with perhaps some unreacted alcohol and/or dimethyl aniline and dimethyl aniline hydrochloride, the latter being present in the form of a precipitate or sludge. The tri-n-butyl phosphite recovered from the filter press 36 as a filtrate should be recycled through the press until a clear product is obtained.

The dimethyl aniline chloride remaining in the filter press 36 as a filter cake is washed with liquefied butane, obtained from the butane storage tank 15, until the cake is freed of occluded tributyl phosphite. The filter cake is then preferably freed of butane by suitable means, such as by heat supplied by steam coils (not shown) in the filter press 36, and removed from the filter press 36 by means of the worm or screw conveyor 38 and introduced through transfer means 39 into the agitator 40 where it is treated to recover the dimethyl aniline as hereinafter described.

The filtrate from the filter press 36 comprising a solution of substantially pure tri normal butyl phosphite in liquefied butane with some unreacted alcohol and/or dimethyl aniline is placed in the glass-lined steam jacketed still or evaporator 43 or 44 and the temperature is gradually increased whereby the butane is vaporized and removed through the lines 45 and 46 to be recompressed as hereinafter described. After substantially all of the butane has been removed the pressure is reduced to 30–50 mm. Hg or lower and the temperature in the still or evaporator raised to about 212° F.–250° F. by introducing steam into the jacket thereof, and any remaining normal butyl alcohol and/or unreacted dimethyl aniline removed and subsequently recovered by any suitable means.

The removal of butyl alcohol and/or dimethyl aniline is accomplished at low pressures since dimethyl aniline has a relatively high boiling point, and tributyl phosphite becomes unstable when distilled at 760 mm. Hg pressure. The operating procedure, therefore, is to flash off the butane at atmospheric pressure, then increase the temperature and reduce the pressure slowly whereby butyl alcohol and/or dimethyl aniline is removed without decomposing the tributyl phosphite.

The product remaining in the evaporator or still is substantially pure tri normal butyl phosphite which is removed from the evaporator, cooled to about 100° F., and stored in storage tank 56 for future use. It is desirable to pass the cooled tri normal butyl phosphite through a canvas filter or other suitable filtering means before passing the same into the storage tank 56.

The gaseous butane removed from the reactors 7 and 8 or the filter press 36 and/or the evaporators 43 and 44 is combined and liquefied by compression and returned to the butane storage tank 15.

The dimethyl aniline chloride in the agitator 40 is mixed with a small amount of water and then treated cautiously with a sodium hydroxide solution of about 50% concentration. This treatment results in the formation of dimethyl aniline base and sodium chloride solution. The dimethyl aniline base which is insoluble in water rises to the surface and is separated from the sodium chloride solution by drawing off the latter through the valved line 68. The dimethyl aniline base, substantially freed of water or sodium chloride solution, is transferred to the settler 71 wherein further separation of water and/or sodium chloride solution takes place and the aqueous layer withdrawn from the bottom of the settler 71 through the valved line 72. The dimethyl aniline base is then passed through a drying tower 75 and dried over calcium oxide or caustic soda to remove the last traces of moisture before being returned to the dimethyl aniline storage tank 2.

We prefer to use dimethyl aniline in the reaction since its immiscibility with water and its high boiling point facilitates the recovery thereof from the dimethyl aniline hydrochloride cake.

If desired the separation of the dimethyl aniline base from the aqueous solution may be effected by adding a solvent such as hexane to the dimethyl aniline base. After separation the water is drawn off and the dimethyl aniline hexane solution placed in a still and the hexane and traces of moisture removed by distillation. The dimethyl aniline is then cooled and returned to the dimethyl aniline storage tank.

Using the herein described method and procedure we have obtained a yield of 66% of butyl phosphite comprising about 85 to 100% tributyl phosphite and less than 15% of dibutyl phosphite. The amount of the dibutyl phosphite obtained is dependent upon the presence of moisture in the system and/or the inefficient removal of hydrochloric acid from the reacting mass. When the process is conducted in the complete absence of moisture and/or with an effective removal of hydrochloric acid substantially pure tributyl phosphite is obtained.

In the preparation of substantially pure trialkyl phosphites it is essential that the hydrogen chloride formed during the reaction period be removed from the sphere of reaction. In addition to the method herein described the hydrogen chloride may be removed by conducting the reaction under a vacuum of from 0.1 to 100 mm. of Hg or by passing an inert gas such as nitrogen, hydrogen, carbon dioxide through the reaction mixture.

While we prefer to use liquefied normally gaseous hydrocarbons as the diluent and refrigerent in our process, other diluents or solvents may be used and other means for controlling the temperature may be employed without departing from the spirit and scope of our invention.

The foregoing detailed description of the preparation of butyl phosphite is intended to illustrate a preferred embodiment of our invention and is not a limitation of the scope thereof, except as defined in the appended claims.

We claim:

1. The method of preparing alkyl phosphites comprising mixing a saturated aliphatic alcohol with a tertiary amine, adding a liquefied volatile hydrocarbon solvent to said mixture and reacting said alcohol and tertiary amine solution with phosphorous trichloride at a temperature not higher than 50° F.

2. The method of preparing alkyl phosphites comprising mixing a saturated aliphatic alcohol with dimethyl aniline, adding a liquefied normally gaseous hydrocarbon to said mixture and reacting said solution with phosphorous trichloride at a temperature not higher than 50° F.

3. The method of preparing alkyl phosphites comprising mixing a saturated aliphatic alcohol with dimethyl aniline, adding liquefied butane to said mixture and reacting the liquefied butane solution of alcohol and dimethyl aniline with phosphorous trichloride at a temperature not higher than 50° F.

4. The method of preparing trinormal butyl phosphite comprising mixing normal butyl alcohol with dimethyl aniline, adding a liquefied normally gaseous hydrocarbon to said mixture and reacting said mixture in the presence of the liquefied normally gaseous hydrocarbon with phosphorous trichloride not higher than 50° F.

5. The method of preparing substantially pure trinomal butyl phosphite comprising mixing normal butyl alcohol with dimethyl aniline, diluting said mixture with a liquefied normally gaseous hydrocarbon and reacting said diluted mixture with phosphorous trichloride at a temperature of about 25° F.

6. The method of preparing substantially pure trinormal butyl phosphite comprising adding to a mixture normal butyl alcohol and dimethyl aniline a liquefied normally gaseous hydrocarbon, reacting said diluted mixture with phosphorous trichloride under pressure, reducing the pressure on said mixture, vaporizing a portion of the liquefied normally gaseous hydrocarbon whereby the temperature of the reacting mass is maintained at a temperature not higher than 50° F., separating the resulting tri normal butyl phosphite from the dimethyl aniline hydrochloride and removing the liquefied normally gaseous hydrocarbon from the tri normal butyl phosphite.

7. The method of preparing substantially pure tri normal butyl phosphite comprising mixing normal butyl alcohol and dimethyl aniline, diluting said mixture with liquefied butane, maintaining said diluted mixture under pressure, reacting said diluted mixture with phosphorous trichloride, maintaining said reacting mass at a temperature of about 25° F. by reducing the pressure of said reacting mass whereby a portion of the liquefied butane is evaporated, separating the tri normal butyl phosphite-butane solution from the reacting mass and removing said butane from the tri normal butyl phosphite.

8. The method of preparing substantially pure tri normal butyl phosphite comprising introducing a mixture of normal butyl alcohol, dimethyl aniline and liquefied butane into a reaction vessel maintained under super atmospheric pressure, adding phosphorous trichloride to said reacting vessel, maintaining a temperature not higher than 25° F. in said reacting vessel by reducing the pressure in the said reacting vessel whereby a portion of the liquefied butane is evaporated, introducing the tri normal butyl phosphite and the dimethyl aniline hydrochloride formed in said reacting vessel into a filter press, separating the tri normal butyl phosphite-butane solution from the dimethyl aniline hydrochloride, washing said separated dimethyl aniline hydrochloride with liquefied butane, separating the liquefied butane from the tri normal butyl phosphite by evaporation, and recovering said gaseous butane removed from said reacting vessel and said tri normal butyl phosphite by compressing and condensing the same.

9. The method of preparing substantially pure tri normal butyl phosphite as described in claim 8 wherein equal molecular volumes of normal butyl alcohol and dimethyl aniline are reacted with 1 mol of phosphorous trichloride per 3 mols of normal butyl alcohol.

10. In the method of preparing a substantially pure tri alkyl phosphite by reacting a mixture of a saturated aliphatic alcohol and dimethyl aniline with phosphorous trichloride the improvement which comprises conducting the reaction in the presence of a liquefied normally gaseous hydrocarbon and maintaining the reaction mass at a substantially uniform temperature not higher than 50° F. by the evaporation of a portion of the liquefied normally gaseous hydrocarbon.

11. In the preparation of substantially pure tri normal butyl phosphite by reacting a mixture of normal butyl alcohol and dimethyl aniline with phosphorous trichloride, the improvement which comprises conducting the reaction under superatmospheric pressure in the presence of liquefied butane and maintaining the reaction mass at a substantially uniform temperature not higher than 50° F. by regulating the pressure in the reaction vessel and evaporating a portion of the liquefied butane.

12. An improved process of preparing substantially pure tri alkyl phosphites which comprises introducing a mixture of a saturated aliphatic alcohol, dimethyl aniline and liquefied butane into a reaction vessel maintained under super atmospheric pressure, adding phosphorous trichloride to said reaction vessel, maintaining the temperature of the reaction mass in said reaction vessel at a substantially uniform temperature not higher than 50° F. by regulating the pressure within the said reaction vessel, and evaporating a portion of the liquefied butane, introducing the products of reaction, comprising substantially tri alkyl phosphite and dimethyl aniline hydrochloride in butane solution, into a filter press, separating the tri alkyl phosphite and liquefied butane as a filtrate from the dimethyl aniline hydrochloride, washing the dimethyl aniline hydrochloride in the filter press with liquefied butane, combining said liquefied butane wash with the tri alkyl phosphite and liquefied butane filtrate, separating the liquefied butane from the substantially pure tri alkyl phosphite by evaporation, recovering the separated butane, removing the dimethyl aniline hydrochloride from said filter press and treating the dimethyl aniline hydrochloride with a caustic soda solution whereby dimethyl aniline is recovered.

13. The improvement in preparing substantially pure tri alkyl phosphite as described in claim 12 wherein the alcohol is normal butyl alcohol.

14. The method of preparing alkyl phosphites comprising mixing a saturated aliphatic alcohol with dimethyl aniline and reacting said mixture in the presence of an inert and readily volatile solvent with phosphorous trichloride at a temperature not higher than 50° F.

15. The method of preparing alkyl phosphites comprising mixing an alkyl alcohol with dimethyl aniline, adding an inert and readily volatile solvent to said mixture, reacting said diluted mixture with phosphorous trichloride and maintaining said reaction mass at a temperature of less than 50° F.

16. The method of preparing alkyl phosphites as described in claim 15 in which the diluent is a liquefied normally gaseous hydrocarbon.

17. The method of preparing alkyl phosphites as described in claim 15 in which the solvent is selected from the group consisting of methyl chloride and methyl ether.

18. The method of preparing alkyl phosphites comprising mixing an alkyl alcohol with dimethyl aniline, adding an inert and readily volatile solvent to said mixture, reacting said diluted mixture with phosphorous trichloride, maintaining said reaction mass at a temperature of less than 50° F., whereby a tri alkyl phosphite and dimethyl aniline hydrochloride are formed, separating said tri alkyl phosphite from said dimethyl aniline hydrochloride, and recovering dimethyl aniline from said dimethyl aniline hydrochloride.

THOMAS H. ROGERS.
CLARENCE M. LOANE.
BERNARD H. SHOEMAKER.